Patented June 24, 1924.

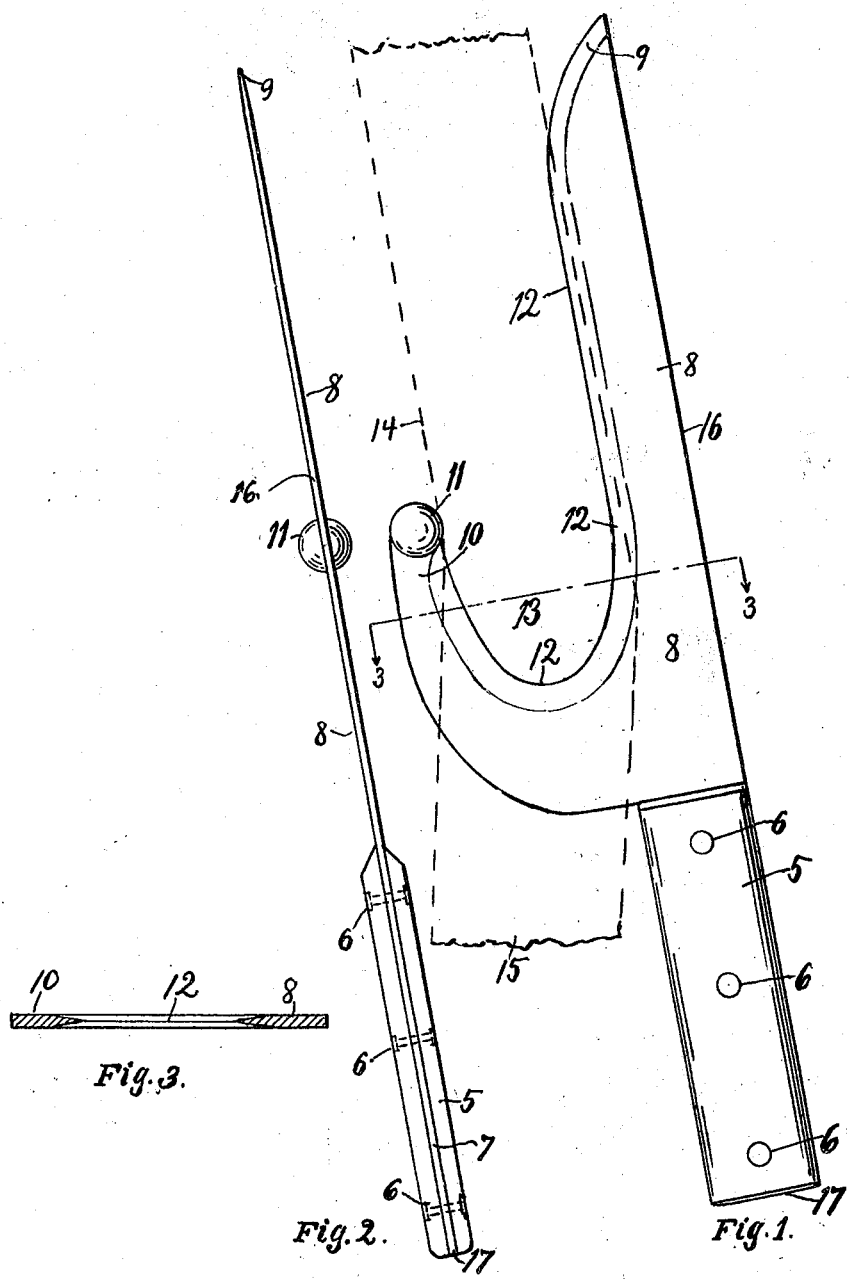

1,498,753

UNITED STATES PATENT OFFICE.

DANIEL I. RENDLICH, OF SOUTH ST. PAUL, MINNESOTA.

CARCASS-OPENING DEVICE.

Application filed March 29, 1924. Serial No. 702,772.

*To all whom it may concern:*

Be it known that I, DANIEL I. RENDLICH, a citizen of the United States, residing at South St. Paul, in the county of Dakota and State of Minnesota, have invented certain new and useful Improvements in Carcass-Opening Devices, of which the following is a specification.

My invention relates to devices used in slaughter houses for opening the carcasses of hogs, calves and other animals preparatory to removing the insides therefrom; and the object is to provide a very simple, inexpensive and efficient device for said purpose. The invention may also be considered as an improvement of the device shown in my United States Patent Number 1,465,866, issued August 21, 1923.

In the accompanying drawing:

Fig. 1 is a side view of my new carcass opening device shown in operation on a portion of a carcass, the latter indicated in dotted outline only.

Fig. 2 is a view of the back of the device looking from right to left in Fig. 1.

Fig. 3 is a section on the line 3—3 in Fig. 1.

Referring to the drawing by reference numerals, 5 designates a handle in which is secured by rivets 6 the flat shank 7 of a knife-shaped main cutting blade 8 having a sharp point 9 and near the handle a blade arm 10 at the end of which is fixed a ball 11. From said ball to the point of the main blade extends a continuous sharp edge 12 which forms a U-curve 13 between the main blade 8 and its arm 10.

In using the device the point 9 is thrust into the carcass to make an opening if such opening is not there from some previous operation. The ball 11 is then pushed through said hole and brought into contact with the inner side 14 of the carcass 15 whereupon the tool is pushed point foremost until the curved edge 12 has cut the desired length of slit in the carcass. If during such operation cartilage or bone be encountered the same may be cut through by striking with a mallet either at the back edge 16 of the blade or at the end 17 of the shank 7.

What I claim is:

1. A device of the class described, the same comprising a steel blade having at one end a sharp point and at the other end a flat shank with a flat handle secured on it and at one edge, near the handle, a branch blade spaced from the main blade and having fixed at its end a head like element, the space between the main blade and its branch forming a U-shaped curve with a continuous sharp edge.

2. The structure specified in claim 1, in which said sharp edge extends to the point of the main blade and to the head on the branch blade.

3. The structure specified in claim 1, in which said head is approximately ball shaped.

In testimony whereof I affix my signature.

DANIEL I. RENDLICH.